United States Patent Office 3,344,340
Patented Sept. 26, 1967

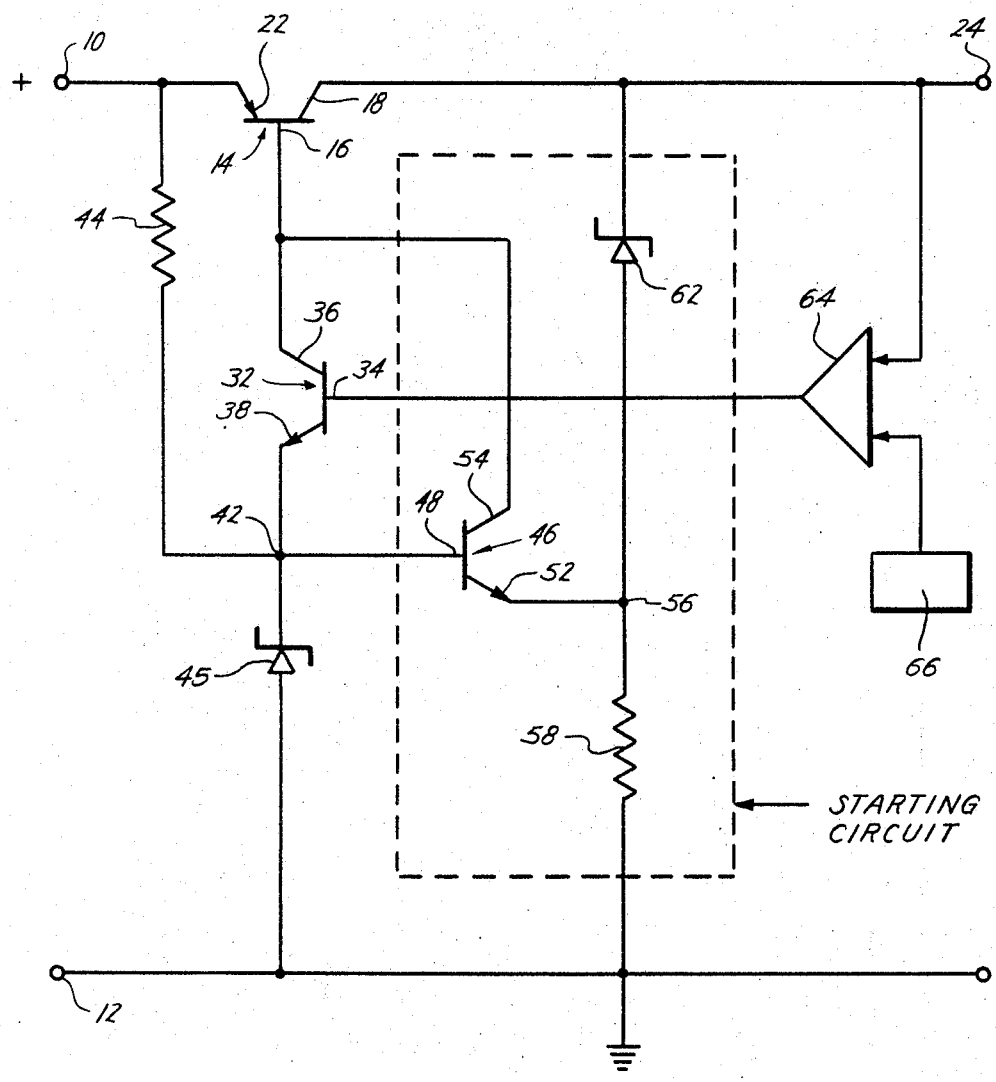
John F. Ringelman
Henry B. Airth, Jr.
INVENTORS

3,344,340
REGULATED POWER SUPPLY
James E. Webb, Administrator of the National Aeronautics and Space Administration, with respect to an invention of John F. Ringelman and Henry B. Airth, Jr.
Filed Nov. 10, 1964, Ser. No. 410,326
6 Claims. (Cl. 323—22)

ABSTRACT OF THE DISCLOSURE

The present invention comprises a power supply having a starting circuit which allows sufficient voltage to be applied to the output side of the power supply when it is first turned on and does not affect the voltage regulator performance during normal operation. Basically, the starting circuit remains active until the regulated output voltage reaches a given voltage level, whereupon the starting circuit is deactivated and the regulator circuitry controls the output voltage at the desired value.

---

This invention relates in general to regulated power supplies and, more particularly, to an improved power supply containing a starting circuit.

In transistorized power supplies the regulated output voltage of a D.C. (direct current) power supply is generally used as a source of power for the regulator control circuitry. Consequently, a sufficient level of output voltage must be present in order for the control circuitry to function. Once this level of output voltage is reached, the control circuitry regulates the output voltage at the desired value.

A common method of starting a regulated power supply is to parallel a series stage transistor of the regulated power supply with a resistor. The resistor supplies sufficient output voltage so that the control circuitry will start to regulate the output voltage. This technique suffers, however, because the regulator circuit loop gain is reduced. Thus, a greater control voltage is needed to control the parallel combination of the series stage transistor and resistor than if the latter were not present in the circuit. Further, the combination of the series stage transistor and resistor reduces the regulator operating range since the parallel combination resistance can be varied over a much more limited range than if the series stage transistor were alone in the circuit. These problems can be particularly serious in a high current, low voltage regulated supply since the value of the resistor paralleling the series stage transistor must be quite small.

In order to overcome the attendant disadvantages of prior art regulated power supplies, the power supply of the present invention utilizes a starting circuit which allows sufficient voltage to be applied to the output side of the power supply when it is first turned on and does not affect the voltage regulator performance during normal operation. Basically, the starting circuit remains active until the regulated output voltage reaches a given voltage level, whereupon the starting circuit is deactivated and the regulator circuitry controls the output voltage at the desired value.

More particularly, the circuit comprises an input terminal for applying a source of unregulated D.C. voltage to the emitter of a series stage transistor. The collector of the series stage transistor is connected to a regulated voltage output terminal and the base is connected to both the collector of a switching transistor in the starting circuit and the collector of a control transistor. Further, a first resistor is connected between the unregulated voltage input terminal and the cathode of a first zener diode, the anode of which is connected to ground. The control transistor emitter is connected to the junction of the first resistor and zener diode. Also connected to this junction is the switching transistor base which has its emitter connected through a second resistor to ground. The anode of a second zener diode is connected to the junction of the second resistor and the switching transistor emitter and the cathode of the second zener diode is connected to the regulated output voltage line. A portion of the signal on the regulated output voltage line and a reference signal are both applied to a difference amplifier. The regulated output voltage and the reference signal are compared by the difference amplifier, and any correctional signals are fed into the base of the control transistor. As the output voltage reaches the desired voltage level the switching transistor is cut off, and the normal control circuitry is used to control the output voltage level.

The advantages of this invention, both as to its construction and mode of operation, will be readily appreciated as the same become better understood by reference to the following detailed description when considered in connection with the accompanying drawing, and wherein:

The figure is a circuit diagram of the novel regulated power supply and starting circuit in accordance with this invention.

Referring now to the drawing, there is shown a regulated power supply containing the novel starting circuit of the subject invention. Unregulated D.C. voltage is applied across a pair of input terminals 10, 12. A series stage transistor 14 having a base 16, collector 18, and emitter 22, is connected by means of the emitter terminal to the unregulated voltage line terminal 10, and its collector 18 is connected to a regulated voltage line 24. The base 16 of the transistor 14 is connected to the collector terminal of a control transistor 32 having a base 34, collector 36, and emitter 38. The emitter 38 of the transistor 32 is connected to a first junction point 42. The junction point 42 has a cathode of a zener diode 45 connected thereto, while the anode thereof is connected to the terminal 12. Further, an input resistor 44 is connected between the junction point 42 and the input terminal 10.

A switching transistor 46 having a base 48, emitter 52, and collector 54 has its base connected to the junction point 42. The collector 54 is connected to the base 16 of transistor 14, and the emitter 52 is connected to a second junction point 56. A resistor 58 is connected between the junction point 56 and terminal 12. A zener diode 62 has its anode connected to junction point 56 and its cathode connected to the regulated voltage line 24. A difference amplifier 64 is connected between the regulated voltage line 24 and the base 34 of the transistor 32. Further, a source of reference voltage 66 is connected to an input terminal of the difference amplifier 64.

When an unregulated positive D.C. voltage is applied to the terminal 10, the voltage at the junction point 42 is clamped to the breadown voltage of the zener diode 45. Until the zener diode 62 breaks down, the voltage at junction point 56 is equal to the breakdown voltage of zener diode 45 minus the base-emitter voltage drop across the transistor 46. Thus, the emitter current of the transistor 46 is equal to the current through the resistor 58, and the collector current of the transistor 46 is directly proportional to the current through the resistor 58.

Since a path for the base current of the transistor 14 has been provided through the collector 54, the transistor 14 will conduct, and the regulated voltage at terminal 24 will start to rise. When the regulated voltage at terminal 24 reaches a value which exceeds the voltage at the junction 56 plus the breakdown voltage of the zener diode 62, the voltage at the junction point 56 will start to increase. As the voltage at junction point 56 rises to a value where the base-emitter circuit of transistor 46 is reverse biased, the transistor 46 will cut off.

The regulated voltage at terminal 24 is compared with a reference voltage 66 by means of the difference amplifier and the resultant signal, which is representative of the difference between the voltage at terminal 24 and the reference voltage, will be fed to the base 34 of the transistor 32. Since the transistor 46 is now cut off, signals applied to the base of transistor 32 will control the base current of the transistor 14 which in turn controls the voltage across the emitter-collector circuit of transistor 14 and thus the regulated voltage at the bus 24.

Should the voltage at the terminal 24 rise to a level greater than desired, the output signal of the amplifier 64 will increase the voltage to the base 34, causing the transistor 32 to conduct more. This, in turn, will cause the voltage at the base 16 to rise, increasing the effective resistance across the collector-emitter circuit of transistor 14, thus causing the voltage at terminal 24 to drop back to the desired level. Should the voltage at terminal 24 drop below the desired level, the signal to the base 34 would drop, causing the transistor 32 to conduct less, thereby lowering the signal to the base 16, and causing the voltage at terminal 24 to start to rise to the desired level.

Thus, as can readily be seen, the starting circuit of the instant invention allows a voltage to be applied to the output side of the power supply when the unregulated voltage is applied to the input terminal, yet the transistor in the starting circuit is effectively removed during the normal regulator operation.

Other variations of the starting circuit are made possible by placing the circuit in different locations within the regulator loop, but the circuit operation would be basically the same. The circuit operation has been described for the case where the starting circuit provides base current for the series stage transistor when this transistor is in the positive side of the line. Of course, other modifications could be provided so that the series transistor would be on a negative line.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A regulating circuit for a source of unidirectional unregulated voltage comprising:
    (a) a first input terminal and a second input terminal between which said unregulated voltage can be applied;
    (b) a first output terminal and a second output terminal for deriving a regulated unidirectional voltage therebetween;
    (c) a series stage PNP-type transistor having a base, an emitter, and a collector;
    (d) means connecting the emitter and collector of said series stage transistor to said first input terminal and said first output terminal, respectively;
    (e) means connecting said second input terminal to said second output terminal;
    (f) means for maintaining a constant voltage at a reference potential junction comprising an input resistor connected between the first input terminal and the reference potential junction and a first zener diode having its cathode connected to said reference potential junction and its anode connected to said second input terminal;
    (g) means providing a path for current flow in the base of said series stage resistor when said unregulated voltage is first impressed across said input terminals comprising an NPN-type switching transistor having a base, emitter, and collector, said switching transistor base and collector being connected to said reference potential junction and said series stage transistor base, respectively;
    (h) means for reverse biasing said switching transistor when the voltage level at said first output terminal reaches a predetermined value comprising a second zener diode having its cathode and anode connected to said first output terminal and said switching transistor emitter, respectively; and
    (j) means for maintaining the voltage level across said output terminals at a predetermined value comprising:
        (1) an NPN-type control transistor having a base, emitter, and collector, said control transistor collector and emitter being connected to said series stage transistor base and said reference potential junction, respectively, and
        (2) a difference amplifier having a pair of amplifier input terminals and an amplifier output terminal, one of said amplifier input terminals being connected to said first output terminal and the other of said amplifier input terminals being connected to a reference signal source, and said amplifier output terminal being connected to said control transistor base.

2. A regulating circuit for a source of unidirectional unregulated voltage comprising:
    a first input terminal and a second input terminal between which said unregulated voltage can be applied;
    a first output terminal and a second output terminal for deriving a regulated unidirectional voltage therebetween;
    a series stage transistor having a base, emitter, and collector;
    means connecting the emitter and collector of said series stage transistor to said first input and first output terminal, respectively;
    means connecting said second input terminal to said second output terminal;
    means for maintaining a constant voltage at a reference potential junction comprising an input resistor connected between the first input terminal and said reference potential junction and a first zener diode having its cathode connected to said reference potential junction and its anode connected to said second input terminal;
    means for providing a path for current flow in the base of said series stage transistor when said unregulated voltage is first impressed across the input terminals comprising a switching transistor having a base, emitter, and collector, said switching transistor base and collector being connected to said reference potential junction and said series stage transistor base, respectively;
    means for reverse biasing said switching transistor when the voltage level at said first output terminal reaches a predetermined value comprising a second zener diode having its cathode and anode connected to said first output terminal and said switching transistor emitter, respectively; and
    means for maintaining the voltage level across said output terminals at a predetermined value comprising:
        (a) a control transistor having a base, emitter, and collector, said control transistor collector and emitter being connected to said series stage transistor base and said reference potential junction, respectively; and
        (b) a difference amplifier having a pair of amplifier input terminals and an amplifier output terminal, one of said amplifier input terminals being connected to said first output terminal and the other of said amplifier input terminals being connected to a reference signal source, said amplifier output terminal being connected to said control transistor base.

3. A regulating circuit for a source of unidirectional unregulated voltage comprising:
- a first input terminal and a second input terminal between which said unregulated voltage can be applied;
- a first output terminal and a second output terminal for deriving a regulated unidirectional voltage therebetween;
- a series stage transistor having a base, an emitter, and collector;
- means connecting the emitter and collector of said series stage transistor to said first input terminal and said first output terminal, respectively;
- means connecting said second input terminal to said second output terminal;
- means for maintaining a constant voltage at a reference potential junction comprising an input resistor connected between the first input terminal and the reference potential junction and a first zener diode having its cathode connected to said reference potential junction and its anode connected to said second input terminal;
- means for providing a path for current flow in the base of said series stage transistor when said unregulated voltage is first impressed across the input terminals comprising a switching transistor having a base, emitter, and collector, said switching transistor base and collector being connected to said reference potential junction and said series stage transistor base, respectively;
- means for reverse biasing said switching transistor when the voltage level at said first output terminal reaches a predetermined value comprising a second zener diode having its cathode and anode connected to said first output terminal and said switching transistor emitter, respectively; and
- means connected between said first output terminal and said series stage transistor base for maintaining the voltage level across said output terminals at a predetermined value.

4. A regulating circuit for a source of unidirectional unregulated voltage comprising:
- a first input terminal and a second input terminal between which said unregulated voltage can be applied;
- a first output terminal and a second output terminal for deriving a regulated unidirectional voltage therebetween;
- a series stage transistor having a base, an emitter, and collector;
- means connecting the emitter and collector of said series stage transistor to said first input terminal and said first output terminal, respectively;
- means connecting said second input terminal to said second output terminal;
- means providing a path for current flow in the base of said series stage transistor when said unregulated voltage is first impressed across said input terminals comprising a switching transistor having a base, emitter and collector, said switching transistor collector being connected to said series stage transistor base;
- means connected to said switching transistor base for providing a bias at said base, said last mentioned means being connected across said input terminals; and
- means for reverse biasing said switching transistor when the voltage level at said first output terminal reaches a predetermined value comprising a zener diode having its cathode and anode connected to said first output terminal and said switching transistor emitter, respectively.

5. A regulating circuit for a source of unidirectional unregulated voltage comprising:
- a first input terminal and a second input terminal between which said unregulated voltage can be applied;
- a first output terminal and a second output terminal for deriving a regulated unidirectional voltage therebetween;
- a series stage transistor having a base, an emitter, and collector;
- means connecting the emitter and collector of said series stage transistor to said first input terminal and said first output terminal, respectively;
- means connecting said second input terminal to said second output terminal;
- means for providing a path for current flow in the base of said series stage transistor when said unregulated voltage is first impressed across said input terminals comprising a switching transistor having a base, emitter, and collector, said switching transistor collector being connected to said series stage transistor base;
- means connected to said switching transistor base for providing a bias at said base, said last mentioned means being connected across said input terminals; and
- means connected between said first output terminal and said switching transistor emitter for reverse biasing said switching transistor when the voltage level at said first output terminal reaches a predetermined value.

6. A regulating circuit for a source of unidirectional voltage comprising:
- a first input terminal and a second input terminal between which said unregulated voltage can be applied;
- a first output terminal and a second output terminal for deriving a regulated unidirectional voltage therebetween;
- a first transistor having a base, collector, and emitter, the collector-emitter circuit of said first transistor being connected between said first input and first output terminals;
- means for allowing a portion of said input voltage to be impressed across said output terminals comprising.
  - (a) a switching transistor having a base, collector, and emitter;
  - (b) means connected between the first input terminal and said switching transistor base, for impressing a bias on said switching transistor base; and
  - (c) means connected between said first transistor base and said switching transistor collector for providing a current path for said first transistor base; and
- means for controlling the level of voltage at the output terminals comprising:
  - (a) means for comparing the voltage at the first output terminal with a reference voltage; and
  - (b) means for applying a correctional signal to the base of said first transistor.

References Cited
UNITED STATES PATENTS
3,031,608  4/1962  Von Eschen et al. _____ 323—22
3,045,169  7/1962  Barber _____ 321—18

JOHN F. COUCH, *Primary Examiner.*

M. L. WACHTELL, *Assistant Examiner.*